C. W. HONABACH.
SHAKING SCREEN.
APPLICATION FILED APR. 14, 1909.
948,222.
Patented Feb. 1, 1910.
2 SHEETS—SHEET 2.
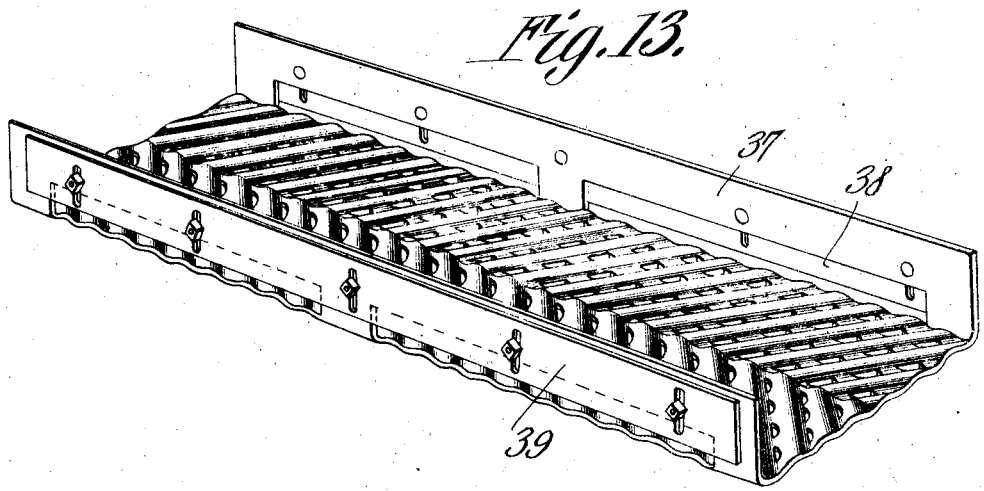
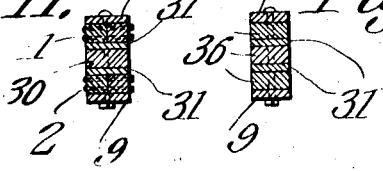
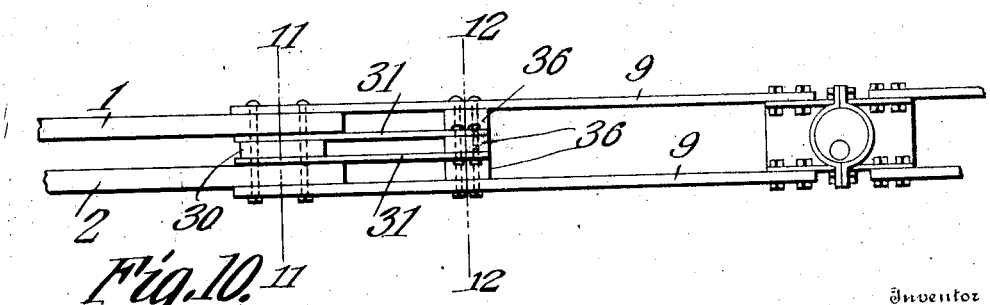
Inventor
Clarence W. Honabach.
Witnesses
By C. A. Snow & Co.
Attorneys

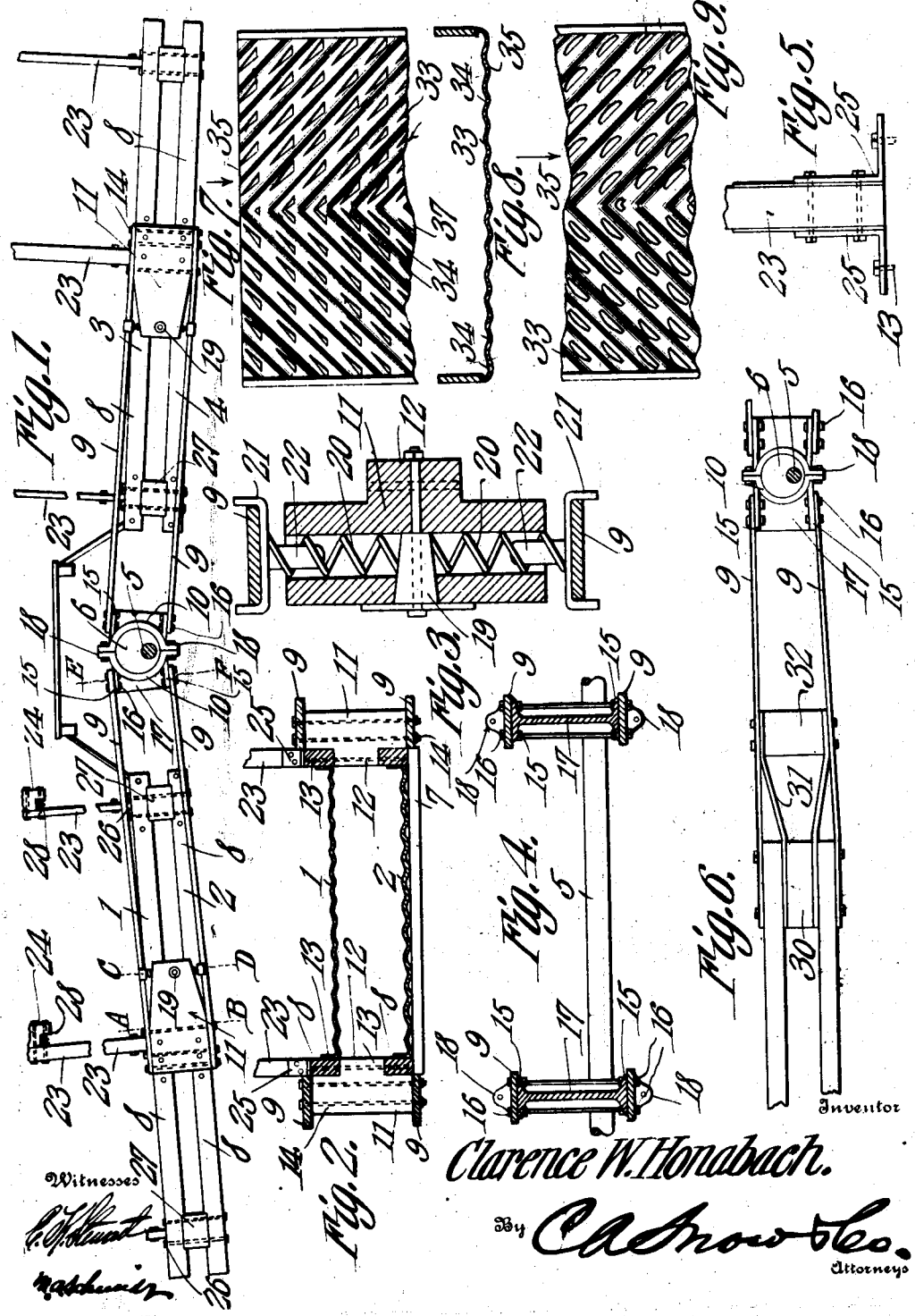

UNITED STATES PATENT OFFICE.

CLARENCE W. HONABACH, OF EDWARDSVILLE, PENNSYLVANIA.

SHAKING-SCREEN.

948,222.     Specification of Letters Patent.     Patented Feb. 1, 1910.

Application filed April 14, 1909. Serial No. 489,857.

*To all whom it may concern:*

Be it known that I, CLARENCE W. HONA-BACH, a citizen of the United States, residing at Edwardsville, in the county of Luzerne and State of Pennsylvania, have invented a new and useful Shaking-Screen, of which the following is a specification.

This invention relates to the screen structure, as well as to the means for operating the screen, its object being to provide a screen which will more effectually separate the material, and also an operating mechanism which is cushioned, thus making the motion of the screen more smooth, and rendering it less liable to breakage and damage.

This screen is designed primarily for separating coal from slate.

With the foregoing objects in view the invention consists in the novel construction and arrangement of parts to be hereinafter described and claimed, reference being had to the drawing hereto annexed in which—

Figure 1 is a side elevation of the screens embodied in the invention. Fig. 2 is a section on the line A B of Fig. 1. Fig. 3 is a section on the line C D of Fig. 1. Fig. 4 is a section on the line E F of Fig. 1. Fig. 5 is a detail view showing the manner of connecting a hanger to the screens. Fig. 6 is an elevation of a modification of the cushioning means hereinafter described. Fig. 7 is a plan view of the screen proper. Fig. 8 is a transverse section thereof. Fig. 9 is a plan view of a modified form of screen. Fig. 10 is an elevation of another modification of the cushioning means. Fig. 11 is a vertical section on the line 11—11 of Fig. 10. Fig. 12 is a vertical section on the line 12—12 of Fig. 10. Fig. 13 is a perspective view of the screen provided with a side discharge.

In the drawings four screens are shown which are arranged in pairs on opposite sides of the drive shaft.

The screens are indicated at 1, 2, 3 and 4, respectively. Each screen may comprise any number coupled in series to form in effect a gang; and the members of each pair are graded to separate the material passing therethrough. The screens 1 and 2 are located opposite the screens 3 and 4. A single operating shaft 5 is provided. Eccentrics 6 are secured to the shaft 5, and are connected to the screens by means of arms or rods to impart a shaking movement thereto. The members of each set of screens are arranged one above the other, and properly spaced apart. Transverse angle bars 7 connect the longitudinal side bars 8 of the screens and serve to reinforce the same. The screens may be connected in any manner, and separated in a way to admit of their free movement.

Connecting rods 9 couple the screens with the eccentric straps 10. The connecting rods have a rigid connection with the screens and with the eccentric straps, thereby preventing wear and play incident to loose or pivot connections. A spring action of the connecting rods 9 is depended upon to assist materially in imparting a movement to the screens which movement prevents in a great measure the clogging of the meshes or openings thereof. The connecting rods may be of any construction, but it is preferred to have each formed of a flat bar or strip of wood or other resilient material in order that the spring action referred to may be had.

A block 11 is secured to the outer sides of the screens intermediate the ends thereof, and is formed upon its inner sides with a reduced portion 12 which fits between the longitudinal side bars 8 of the screens, and serves as a filler or spacer to hold the screens separated. Bolts 13 pass through the side bars, and through the spacer 12, and connect all together. One of the ends of the connecting rod 9 is attached to the block 11, and, since it is preferred to provide each set of screens with four connecting rods, bolts 14 are employed for connecting the upper and lower connecting rods to the upper and lower faces of the blocks 11. It will be noted that this construction throws the connecting rods to one side of the screens, so as not to interfere with the screens when in operation. It is not absolutely necessary to connect the rods 9 to the middle portion of the screens, but this arrangement is preferable.

The eccentric strap is formed of similar parts or sections which are fitted about the eccentric 6 and secured thereto. Each strap section is formed with an upper and a lower flange 15, to which the upper and lower connecting rods 9 are respectively secured by bolts 16 or other suitable fastening means. The upper and lower flanges are connected by an intermediate web 17, and each strap section has an off-standing lug 18 which is provided with bolt holes to receive the bolts or other fastening means by which the two sections are joined.

By connecting the rods 9 to the eccentric strap sections as hereindescribed, said rods stay each other, and prevent the strap sections from being connected too tightly to the eccentric, thus preventing breakage of the rods.

Each block 11 has an end portion facing the shaft 5, said portion being reduced by being tapered, as indicated most clearly in Fig. 1, and this reduced portion is supplied with a buffer, or yielding means to prevent injurious contact of the rods 9 therewith. The buffer comprises a tube 19 secured in a transverse opening at the reduced end of the block, springs 20 arranged above and below the tube 19, and shoes 21, the latter having stems 22 which project into the outer ends of the springs 20, so as to retain the parts in place. The shoes are flanged, and may be protected by a lining of rubber, felt or the like to prevent injury to the connecting rods 9 during the operation of the machine.

Hangers 23 support the screens, and are connected at their upper ends to beams or supports 24, and are made fast at their lower ends to the screens. The hangers may be of any construction, and are preferably resilient, so as to also assist in the shaking action of the screens. Angle irons or brackets 25 connect the lower ends of the hangers 23 with the longitudinal side bars 8 of the screens. The angle iron 25 of one pair of hangers may be secured to the screens by the bolts 13, and those of the other hangers by the bolts or fastenings 26 employed for connecting the screens to one another, and to interposed spacing blocks 27 at the ends thereof. Buffer means 28 are interposed between the upper ends of the hangers and their supports 24, and consist of springs. Portions of the supports 25 opposite to the upper ends of the hangers are cut away to permit of said hangers having sufficient play.

In the modification shown in Fig. 6 the rods 9 are secured to the front end of the screen or that end nearest to the shaft 5, said connection being made by means of spacing blocks 30 fitting between the longitudinal side bars of the screens, the upper and lower surfaces of which blocks are engaged respectively by spring strips 31 secured to a block 32 located between the rods 9, and secured thereto. The function of the spring strip 31 is the same as the springs 20 and their associate parts.

The construction of the screen proper is shown in Figs. 7 and 8, a modification being shown in Fig. 9. Said screen comprises a plate 33 having perforations 34, and diagonally extending corrugations 35. These corrugations extend in opposite directions from the longitudinal middle portion of the plate, and the perforations 34 are made in the channels formed thereby. In Fig. 7 the perforations are shown as triangular, but the shape is immaterial and the perforations may be shaped as shown in Fig. 9.

The material to be separated is carried across the plate 33 in the direction of the arrow, and as it glides along, the heavier particles will settle into the channels formed by the corrugations, while the lighter particles will roll or glide over the particles settling in said channels. As the perforations are in the channels, the heavier particles will be discharged from the screens. The angle of the channels will keep them clear, and the material is prevented from clogging therein.

It is not necessary to have the spring strips 31 in the particular bent shape shown in Fig. 6. They may be straight strips as shown in Fig. 10, the strips being secured to the rods 9 by means of three blocks 36 mounted between the rods and bolted or otherwise secured thereto. At their opposite ends the spring strips engage the screen frame in the same manner as in Fig. 6. Any other suitable method may be employed for connecting the spring strips.

In Fig. 13 is shown a screen provided with diagonal corrugations similar to the structure shown in Figs. 7 to 9. At the longitudinal edges of the screen are upstanding flanges 37 provided with openings 38 extending down to the plane of the corrugated plate. The corrugations extend in the direction of these openings, and the material is adapted to be discharged therethrough. The height of the openings is controlled by a slide 39 adjustably mounted on the flanges 37, by means of which slide the height of the openings may be varied. The material collecting in the channels works along the same to the openings 38, and is discharged therethrough. The slate being heavier, will work into the corrugations, and the weight of the coal on this layer of slate will cause the latter to be pushed along the channels, and to drop through the openings therein. Any of the slate which does not drop through the openings in the channels works toward the openings 38 and is discharged therethrough.

What is claimed is:

1. In combination, a series of spaced and coupled screens, driving means therefor, resilient connections between the driving means and the upper and lower screens of the series, and buffer means between said connections.

2. In a device of the character specified, the combination of a shoe, a block having connection with the shoe and having a reduced end portion, an eccentric, connecting rods attached at one end to the upper and lower portions of said block and, at the opposite end to the said eccentric, and buffer means between the reduced end of said block and the said connecting rods.

3. In combination, a series of superposed spaced screens, blocks having portions secured between said screens to space the same, said blocks having a reduced end portion, an eccentric, connecting rods between said eccentric and the blocks and attached to the latter at their upper and lower portions, and buffer means applied to the reduced end of the blocks between the same and the connecting rods.

4. In combination, a series of vertically spaced screens, blocks secured to the screens and serving to space the same, rods for imparting a shaking movement to the screens and connected to the upper and lower portions of the blocks, a support fitted in a transverse opening of each block, springs arranged upon opposite sides of the support, and a shoe mounted upon the springs and engageable with the connecting rods.

5. The combination with an eccentric and its shaft, of a series of shaking screens arranged in pairs on opposite sides of the shaft, sectional eccentric straps, each of said strap sections having upper and lower flanges, rods connected to one of the members of said pair of screens and to the flanges of one of the strap sections, and rods connected to the other member of said pair of screens and to the flanges of the other strap sections.

6. A screen comprising a diagonally corrugated and perforated plate, upstanding flanges at the longitudinal edges of the plate, said flanges having discharge openings, and slides controlling said openings.

7. A screen comprising a diagonally corrugated and perforated plate, the corrugations extending in opposite directions from the longitudinal middle portion of the plate, upstanding flanges at the longitudinal edges of the plate, said flanges having discharge openings, and slides controlling said openings.

In testimony that I claim the foregoing as my own, I have hereto affixed my signature in the presence of two witnesses.

CLARENCE W. HONABACH.

Witnesses:
CHAS. S. BRYANT,
ALONZO H. JONES.